United States Patent
Darrow, Jr. et al.

(10) Patent No.: US 10,604,247 B2
(45) Date of Patent: Mar. 31, 2020

(54) TENSION TORSION STRAP

(71) Applicant: Sikorsky Aircraft Corporation, Stratford, CT (US)

(72) Inventors: David A. Darrow, Jr., Mesa, AZ (US); Ron William Waldo, North Richland Hills, TX (US); Joshua Richards, Fort Worth, TX (US); Kristopher Michael Haydel, Fort Worth, TX (US); Lance Halcom, Coppell, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 169 days.

(21) Appl. No.: 15/580,174

(22) PCT Filed: Jun. 9, 2016

(86) PCT No.: PCT/US2016/036653
§ 371 (c)(1),
(2) Date: Dec. 6, 2017

(87) PCT Pub. No.: WO2016/201079
PCT Pub. Date: Dec. 15, 2016

(65) Prior Publication Data
US 2018/0148166 A1    May 31, 2018

Related U.S. Application Data

(60) Provisional application No. 62/174,275, filed on Jun. 11, 2015.

(51) Int. Cl.
*B64C 27/48* (2006.01)
*B64C 27/33* (2006.01)
*B64C 27/10* (2006.01)

(52) U.S. Cl.
CPC .............. *B64C 27/48* (2013.01); *B64C 27/33* (2013.01); *B64C 27/10* (2013.01)

(58) Field of Classification Search
None
See application file for complete search history.

(56) References Cited

U.S. PATENT DOCUMENTS

| 2,961,051 A | 11/1960 | Wilford et al. |
| 3,884,594 A | 5/1975 | Fradenburgh |

(Continued)

FOREIGN PATENT DOCUMENTS

KR    100799122 B1    1/2008

OTHER PUBLICATIONS

PCT Invitation to Pay additional Fees and, where applicable, protest fee; International Application No. PCT/US16/36653; International Filing Date: Jun. 9, 2016, dated Sep. 6, 2016, pp. 1-2.

(Continued)

*Primary Examiner* — Christopher Verdier
*Assistant Examiner* — Jason A Fountain
(74) *Attorney, Agent, or Firm* — Cantor Colburn LLP

(57) ABSTRACT

A tension torsion strap by which a blade is connectable with a hub of a propulsor is provided. The tension torsion strap includes an elongate body formed to define attachment features at opposite ends thereof, the attachment features being connectable to the blade at one of the opposite ends and to the hub at the other of the opposite ends, fibrous materials extending along the elongate body and around the attachment features and pretension flanges elastically interposable between the hub and the elongate body. The pretension flanges are configured to maintain pretension in the fibrous materials above a predefined pretension level when the attachment features are connected to the blade and the hub.

14 Claims, 6 Drawing Sheets

(56) References Cited

U.S. PATENT DOCUMENTS

| | | | |
|---|---|---|---|
| 4,264,277 A * | 4/1981 | McCafferty | B64C 27/35 403/348 |
| 4,373,862 A | 2/1983 | Ferris et al. | |
| 4,477,225 A | 10/1984 | Burkam | |
| 4,534,704 A | 8/1985 | McArdle | |
| 4,666,372 A * | 5/1987 | Avila | B64C 27/33 267/279 |
| 5,059,094 A | 10/1991 | Robinson et al. | |
| 6,454,207 B1 | 9/2002 | Yamakawa et al. | |
| 8,235,665 B2 * | 8/2012 | Muylaert | B64C 27/33 29/889.6 |
| 2010/0034654 A1 * | 2/2010 | Muylaert | B64C 27/33 416/134 A |
| 2015/0034772 A1 | 2/2015 | Foskey et al. | |

OTHER PUBLICATIONS

PCT ISR Written Opinion; International Application No. PCT/US 16/36653; International Filing date: Jun. 9, 2016, dated Nov. 7, 2016, pp. 1-6.

PCT Notification of Transmittal of the International Search Report; International Application No. PCT/US 16/36653; International Filing date: Jun. 9, 2016, dated Nov. 7, 2016, pp. 1-9.

* cited by examiner

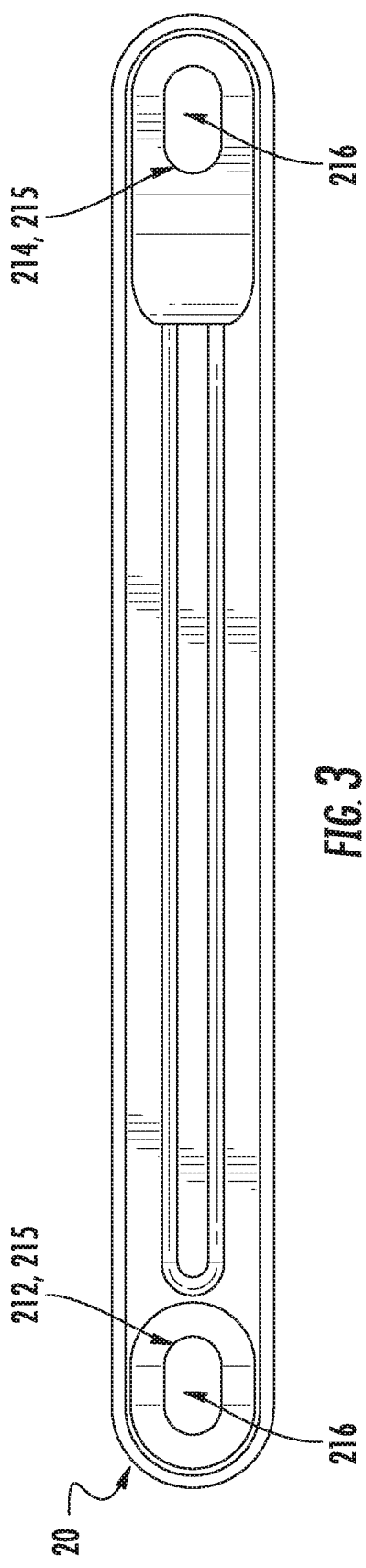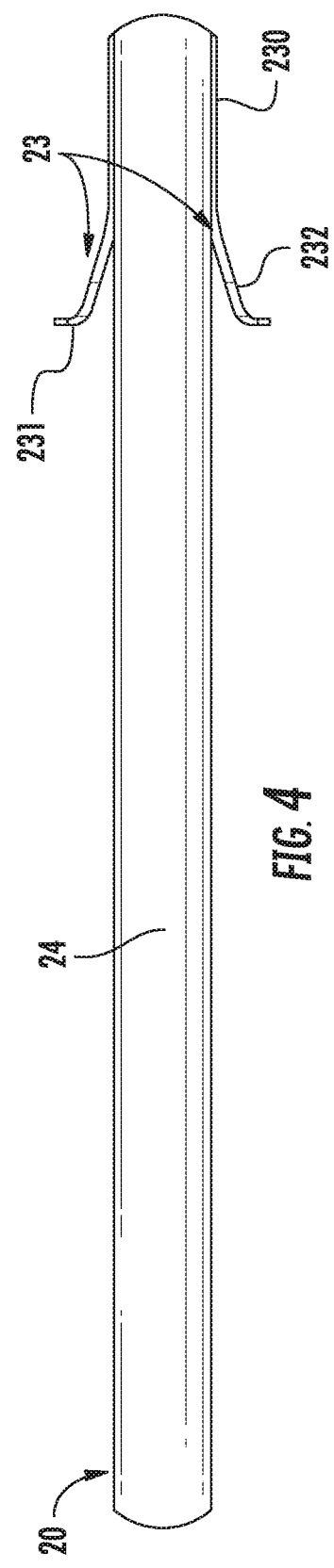

TENSION TORSION STRAP

CROSS REFERENCE TO RELATED APPLICATIONS

This application is a National Stage application of PCT/US2016/036653, filed Jun. 9, 2016, which claims the benefit of U.S. Provisional Application No. 62/174,275, filed Jun. 11, 2015, both of which are incorporated by reference in their entirety herein.

STATEMENT OF FEDERAL SUPPORT

This invention was made with Government support under Agreement No. W911W6-13-2-0003 for the Joint Multi-Role Technology Demonstrator Phase I— Air Vehicle Development program. The Government has certain rights in the invention.

BACKGROUND

The subject matter disclosed herein relates to a tension torsion strap and, more particularly, to a tension torsion strap, a propulsor including a tension torsion strap and a method of applying pretension to a tension torsion strap.

Compound helicopters generally include a main rotor assembly with coaxial, counter-rotating main rotors and a propulsor. The main rotor assembly is disposed at an upper portion of the helicopter airframe and the propulsor is disposed at a tail of the helicopter. The main rotor assembly generates lift, thrust and yaw control while the propulsor generally assists with the generation of thrust for forward flight although it can generate lift and provide for additional yaw control as well.

BRIEF DESCRIPTION

According to one aspect, a tension torsion strap by which a blade is connectable with a hub of a propulsor is provided. The tension torsion strap includes an elongate body formed to define attachment features at opposite ends thereof, the attachment features being connectable to the blade at one of the opposite ends and to the hub at the other of the opposite ends, fibrous materials extending along the elongate body and around the attachment features and pretension flanges elastically interposable between the hub and the elongate body. The pretension flanges are configured to maintain pretension in the fibrous materials above a predefined pretension level when the attachment features are connected to the blade and the hub.

In accordance with additional or alternative embodiments, the elongate body includes an I-beam.

In accordance with additional or alternative embodiments, the elongate body includes a strap casing to encompass the fibrous materials.

In accordance with additional or alternative embodiments, the strap casing includes urethane.

In accordance with additional or alternative embodiments, the attachment features include racetrack-shaped spools.

In accordance with additional or alternative embodiments, the fibrous materials have a spherical cross-sectional shape at each of the opposite ends.

In accordance with additional or alternative embodiments, the fibrous materials include Kevlar™.

In accordance with additional or alternative embodiments, the pretension flanges each include a plate element affixable to one of the opposite ends of the elongated body, a flange abuttable with the hub and an elastic member by which the flange is coupled with the plate element.

In accordance with additional or alternative embodiments, the predefined pretention level is a percentage of an expected centrifugal force load.

According to another aspect, a propulsor is provided and includes a hub including first and second plates respectively formed to define attachment through-holes at blade locations, a hub casing including an interior part surrounding the hub and hub arm parts extending outwardly from the interior part at the blade locations and tension torsion straps. The tension torsion straps are extendable through the hub arm parts to connect blades with the hub at the blade locations.

In accordance with additional or alternative embodiments, oblong fasteners are extendable through the attachment through-holes and features.

In accordance with additional or alternative embodiments, pretension assemblies are respectively disposed at each of the hub arm parts.

In accordance with additional or alternative embodiments, pretension flanges are elastically interposable between a corresponding one of the pretension assemblies and the elongate body and are configured to maintain pretension in the fibrous materials of a percentage of an expected centrifugal force load.

According to yet another aspect, a method of applying pretension to a tension torsion strap by which a blade is connectable with a hub of a propulsor is provided. The hub includes a hub casing including an interior part and hub arm parts such that the interior part surrounds the hub and the hub arm parts extend outwardly from the interior part. The method includes manipulating pretension assemblies to assume first, non-tightening positions on the hub arm parts, connecting tension torsion straps to the hub and blades and re-manipulating the pretension assemblies to assume second, tightening positions on the hub arm parts and against pretension flanges of the tension torsion straps.

In accordance with additional or alternative embodiments, the method further includes securing the pretension assemblies in the second, tightening positions.

These and other advantages and features will become more apparent from the following description taken in conjunction with the drawings.

BRIEF DESCRIPTION OF THE DRAWINGS

The subject matter of this disclosure is particularly pointed out and distinctly claimed in the claims at the conclusion of the specification. The foregoing and other features, and advantages of exemplary embodiments are apparent from the following detailed description taken in conjunction with the accompanying drawings in which:

FIG. 3 is a top-down view of the tension torsion strap of FIG. 2;

FIG. 4 is a side view of the tension torsion strap of FIG. 2;

The detailed description explains exemplary embodiments, together with advantages and features, by way of example with reference to the drawings.

DETAILED DESCRIPTION

As will be described below, weight reduction goals for the propulsor of a coaxial, counter-rotating helicopter are met by a unique configuration utilizing tension torsion straps to restrain propulsor blade centrifugal forces and roller pitch bearings to restrain propulsor blade bending moments. The roller pitch bearings are inserted over metallic spindles that are integral to the propulsor rotor shaft. The propulsor blade is inserted over the pitch bearing outer races. This configuration concentrates the metal hub attachment at the smallest possible diameter reducing propulsor hub weight. The tension torsion straps eliminate centrifugal force loads from the pitch bearings, which facilitates minimizations of the size and weight of the pitch bearings. The tension torsion straps also incorporate a compact spool design with racetrack-shaped spools that allow for the use of racetrack-shaped shear pins that could react high centrifugal force loads but also minimize the size of the tension torsion strap width. A pair of flanges is incorporated into the outboard spool to provide for application of pretension to the tension torsion strap.

Figure 1:
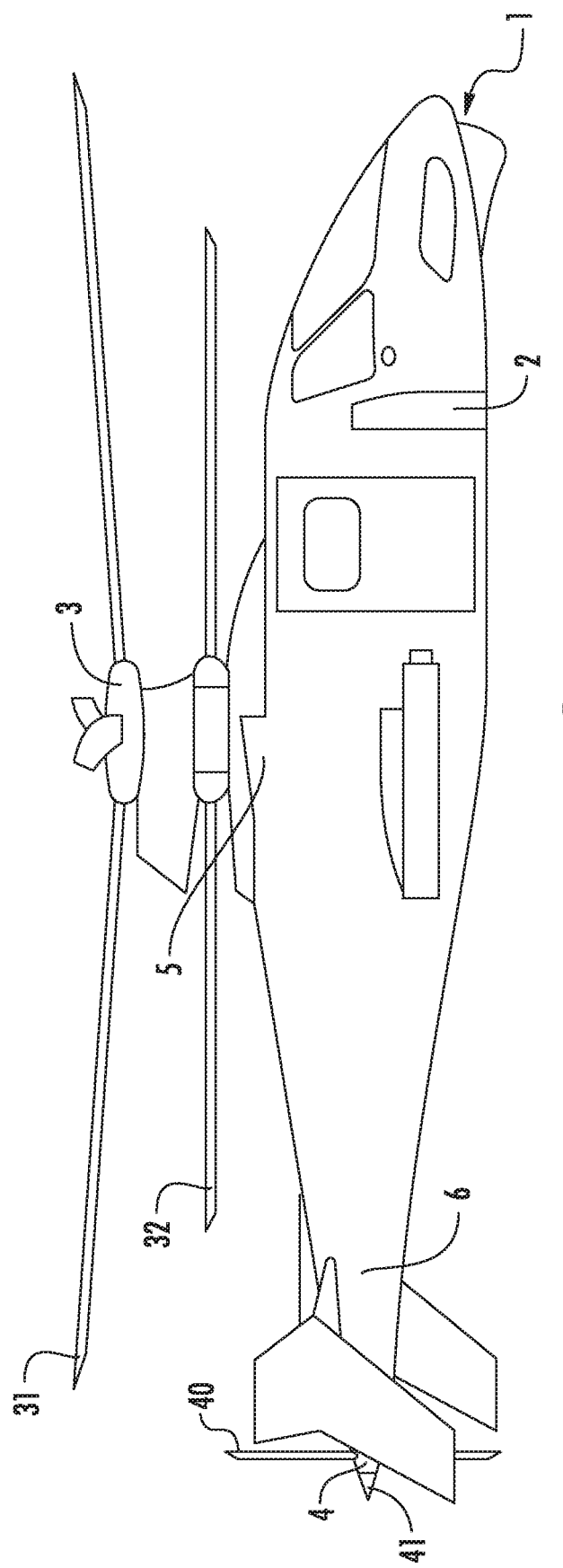
FIG. 1 is a perspective view of a coaxial, counter-rotating helicopter in accordance with embodiments.
Figure 2:
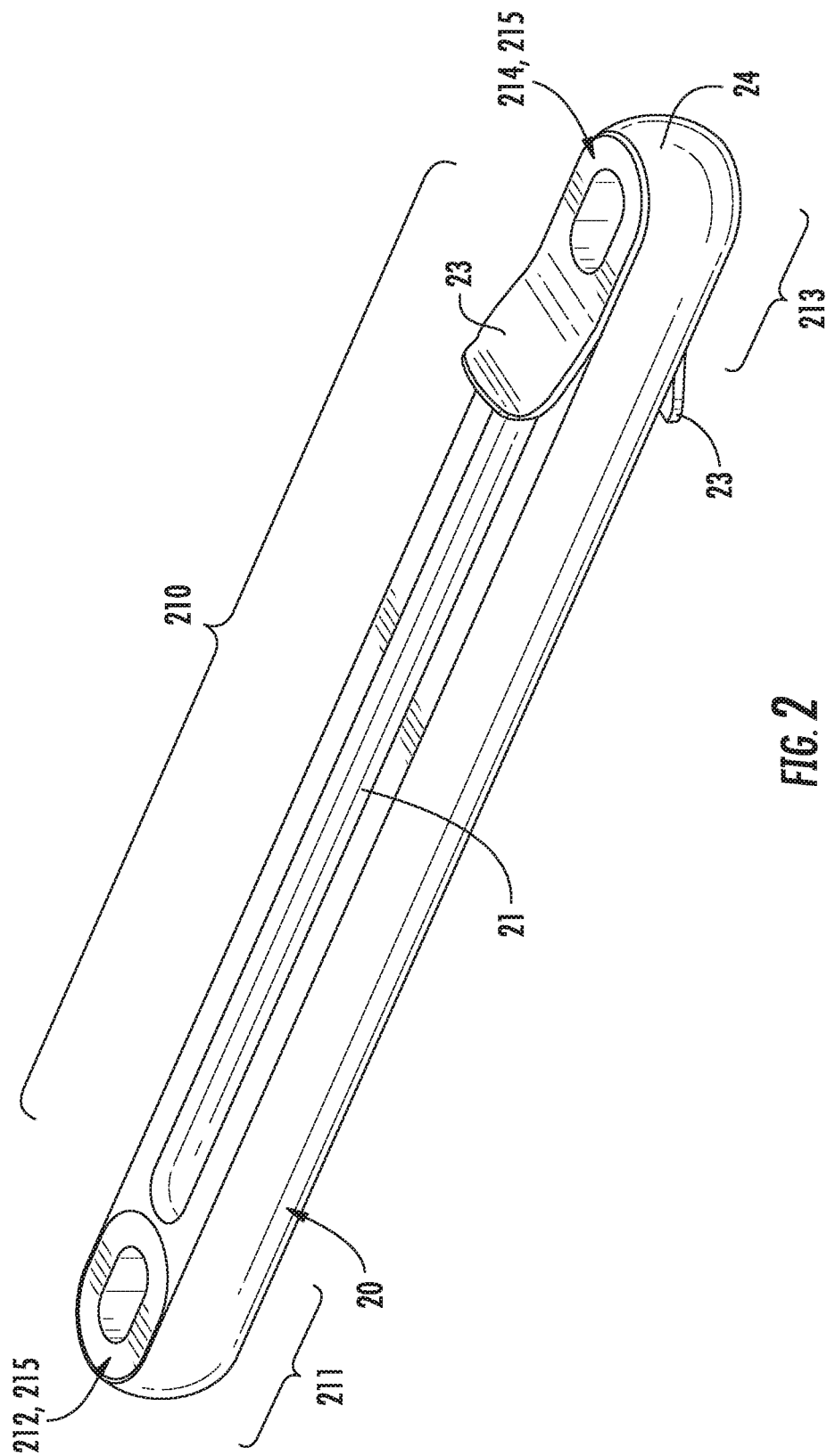
FIG. 2 is a perspective view of a tension torsion strap in accordance with embodiments.

With reference to FIG. 1, a helicopter 1 is provided with a coaxial, counter-rotating configuration. The helicopter 1 includes an airframe 2, which is formed to accommodate a cockpit, crew and, in some cases, passengers, a main rotor assembly 3 and a propulsor 4. The main rotor assembly 3 is operably disposed at an upper portion 5 of the airframe 2 and includes an upper rotor 31 and a lower rotor 32. The upper and lower rotors 31 and 32 rotate in opposite directions about a common rotational axis to generator lift and thrust for the helicopter 1. The propulsor 4 is operably disposed at a tail portion 6 of the airframe 2 and is configured to generate thrust for the helicopter 1. In accordance with various embodiments, the propulsor 4 may include a set of blades 40 (e.g., a set of eight blades 40) that extend radially outwardly from a central hub 41 to be rotatable about a rotational axis defined through the central hub 41.

The helicopter 1 may also include an engine, a transmission system and a flight computer. The engine generates power that can be used to drive rotations of the upper rotor 31, the lower rotor 32 and the propulsor 4. The transmission system serves to transmit the power generated by the engine to the main rotor assembly 3 and the propulsor 4. The flight computer and an associated flight control system control various operations of at least the engine, the transmission system, the main rotor assembly 3 and the propulsor 4 in accordance with crew commands and current flight conditions.

With reference to FIGS. 2-6, a tension torsion (TT) strap 20 is provided for use in the propulsor 4 of the helicopter 1. The TT strap 20 serves to connect each of the blades 40 with the central hub 41 of the propulsor 4 and includes an elongate body 21, fibrous materials 22 (see FIGS. 5 and 6), pretension flanges 23 and a casing 24 (see FIG. 6). The elongate body 21 is generally rigid and may include an I-beam section 210 with a first or inboard end 211, which is formed to define a first attachment or anti-rotation feature 212, and a second or outboard end 213. The outboard end 213 is opposite the inboard end 211 and is formed to define a second attachment or anti-rotation feature 214. In accordance with embodiments, the first and second anti-rotation features 212 and 214 may include racetrack-shaped spools 215 that have interior, oblong vias 216.

Figure 5:
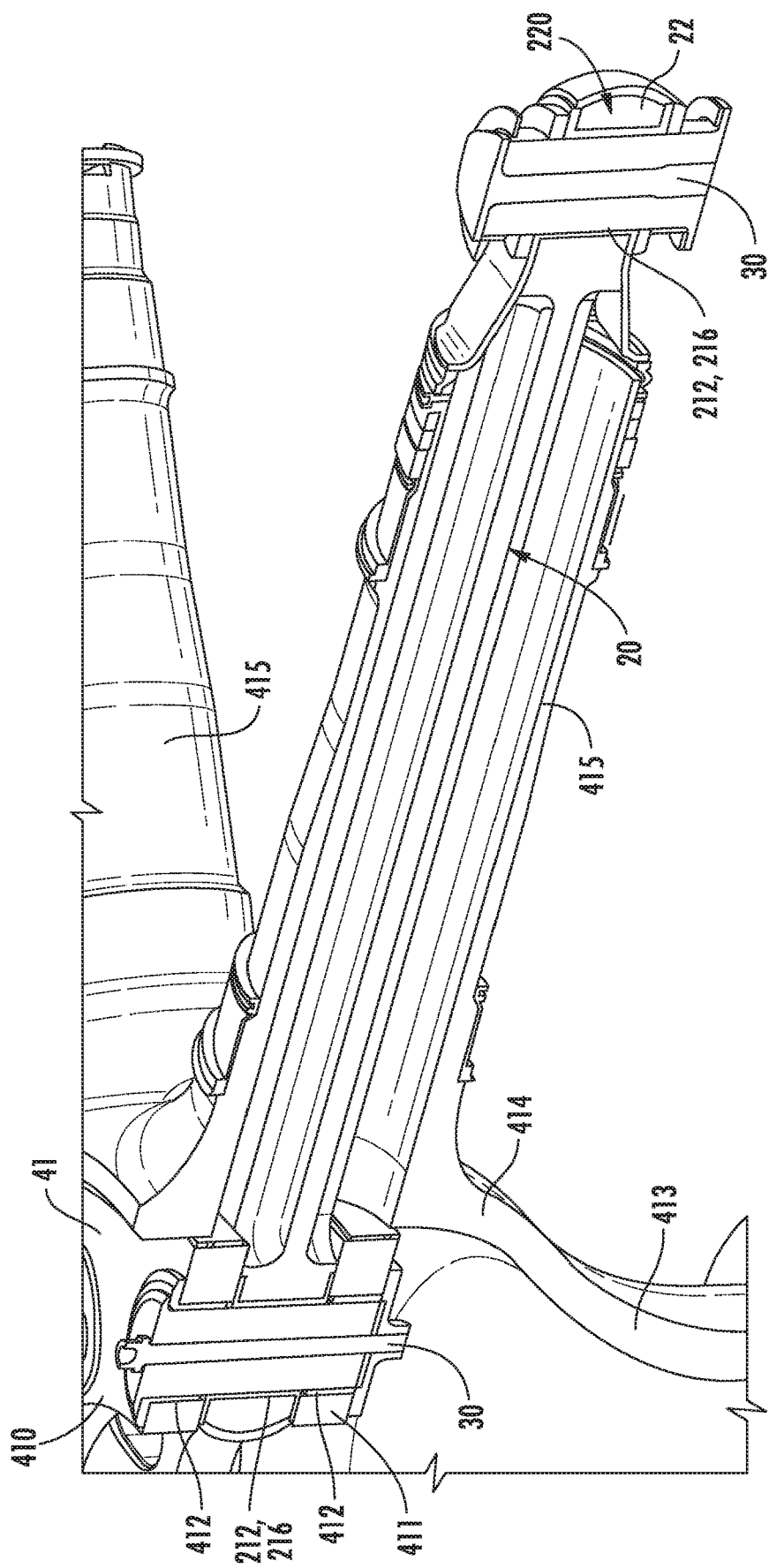
FIG. 5 is a perspective view of a portion of a propulsor of the helicopter of FIG. 1.
Figure 6A:
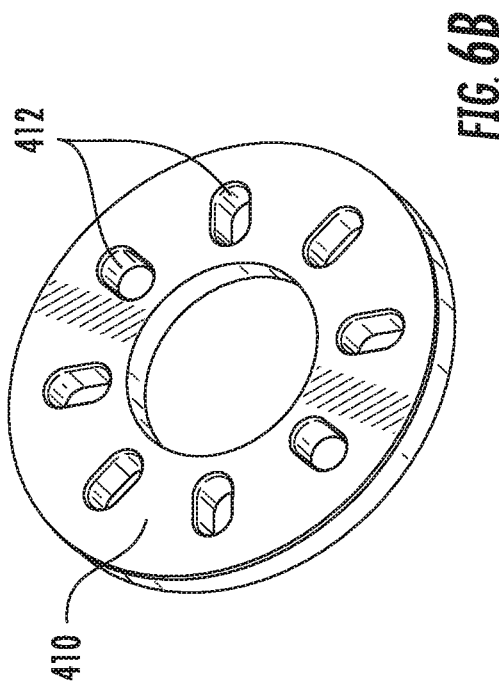
FIG. 6A is a perspective view of a forward hub plate in accordance with embodiments.
Figure 6B:
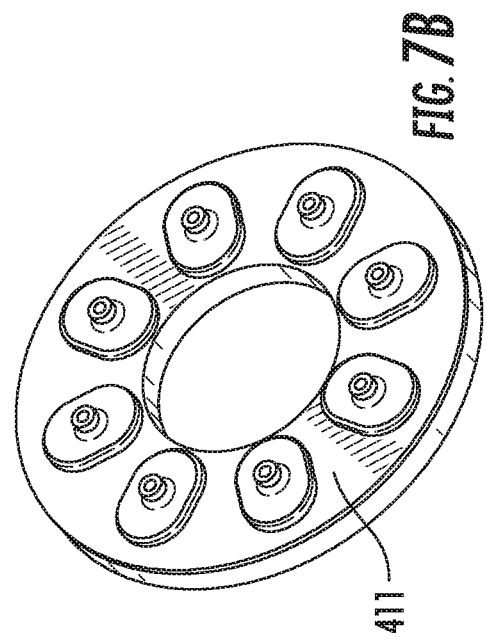
FIG. 6B is a perspective view of the forward hub plate from an opposite direction as compared to FIG. 6A.

The fibrous materials 22 extend along the elongate body 21 in parallel with a longitudinal axis of the elongate body 21 and continuously extend around the exterior curvatures of the racetrack-shaped spools 215 of the first and second anti-rotation features 212 and 214. The fibrous materials 22 are thus patterned in layers about the elongate body 21 to have a varying thickness and cross-sectional shape. Particularly, along the elongate body 21 and at the bend of the fibrous materials 22 around the racetrack-shaped spools 215 at each of the inboard end 211 and the outboard end 213, the fibrous materials 22 have a segmented, spherical cross-sectional shape 220. That is, as shown in FIGS. 5 and 6, when taken as a whole, the fibrous materials 22 form a shape with three adjacent flat sides 221 and one outwardly curved side 222.

The casing 24 may be formed of urethane or another similar material and encompasses the fibrous materials 22 about the TT strap 20. The casing 24 mimics the outer shape of the fibrous materials 22 along the elongate body 21 and around the inboard end 211 and the outboard end 213. That is, top and bottom sides of the TT strap 20 may be substantially flat or planarized while lateral sides and longitudinal ends of the TT strap 20 may be curved outwardly.

In order to reduce a weight of the TT strap 20 without sacrificing strength, the fibrous materials 22 may be formed of a lightweight material such as Kevlar™ or other para-aramid synthetic fibers. However, since the use of a material like Kevlar™ fibers for the fibrous materials 22 requires that the fibrous materials 22 be maintained in tension at all times, pretension is applied to the TT straps 22 once the TT straps are formed and installed into the propulsor 4. This will be discussed in greater detail below.

Figure 7A:
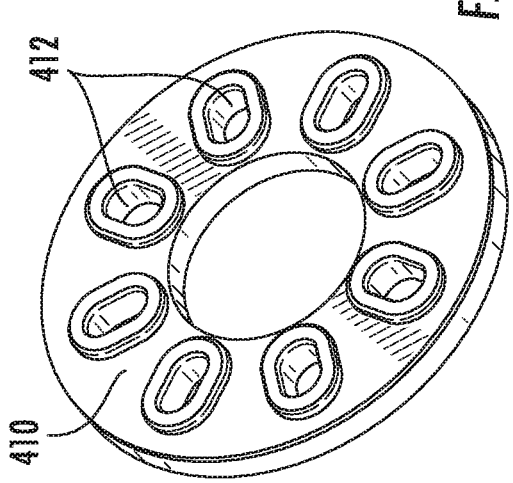
FIG. 7A is a perspective view of an aft hub plate in accordance with embodiments.
Figure 7B:
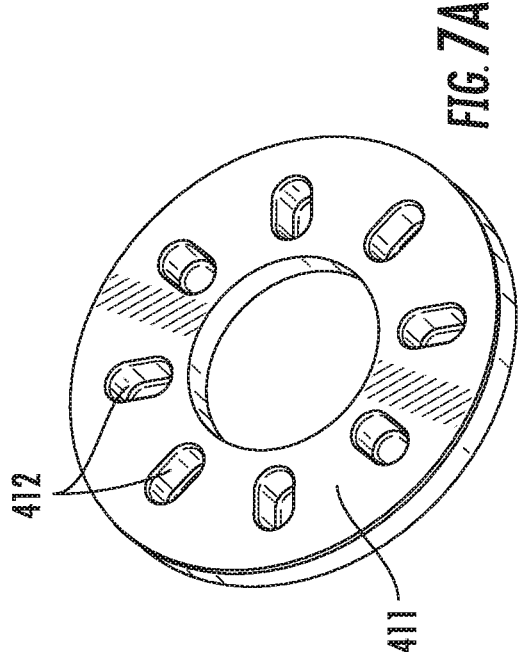
FIG. 7B is a perspective view of the aft hub plate from an opposite direction as compared to FIG. 7A.

With continued reference to FIG. 5 and with additional reference to FIGS. 6A, 6B, 7A and 7B, the central hub 41 includes a first or forward centrifugal load plate (hereinafter referred to as a "first plate") 410 (see FIGS. 6A and 6B) and a second or aft centrifugal load plate (hereinafter referred to as a "second plate") 411 (see FIGS. 7A and 7B). The first and second plates 410 and 411 may be aligned with and disposed proximal to one another and are respectively formed to define attachment or anti-rotation through-holes 412 at their various blade locations (i.e., the circumferential locations corresponding to the locations of the blades 40). The central hub 41 further includes a hub casing 413 that in turn includes an interior part 414 and hub arm parts 415. The interior part 414 surrounds the first and second plates 410 and 411. The hub arm parts 415 extend outwardly from the interior part 414 at the blade locations and may be formed as tapered cylindrical elements.

The TT straps 20 extend through the hub arm parts 414 to connect to the first and second plates 410 and 411 and to thereby connect the blades 40 with the central hub 41 at the blade locations. In greater detail, the TT straps 20 extend through the hub arm parts 414 such that the first anti-rotation features 212 and the interior, oblong vias 216 of the inboard ends 211 align with the anti-rotation through-holes 412 of the first and second plates 410 and 411. With this arrangement, oblong fasteners 30 are extendable through the anti-rotation through-holes 412 and the first anti-rotation features 212 to secure the TT straps 20 in place without permitting rotation of the TT straps 20 relative to the central hub 41. The oblong fasteners 30 can also be used to secure the blades 40 to the TT straps 20 at the oblong vias 216 of the outboard ends 213 without permitting rotation of the blades 40 relative to the TT straps 20.

With the above-described arrangement, at least some of the blades 40 will be positioned at the top of the propulsor 4 with the helicopter 1 in a grounded condition where the propulsor 4 is not rotating and thus not generating centrifugal loads. In this case, the weight of the "top side" blades 40 must be overcome by pretension applied to the corresponding TT straps 20 lest the corresponding TT straps 20 be exposed to compressive forces due to the weight of the blades 40.

To this end, the pretension flanges 23 may be elastically interposable between distal ends of the hub arm parts 415 and the top and bottom sides of the TT straps 20 with the pretension flanges 23 being configured to maintain pretension in the fibrous materials above a predefined level. In accordance with embodiments, the predefined pretension level may be a relatively small percentage (e.g., about 1%) of an expected centrifugal force load, which will always exceed at least the weight of each of the blades 40. In accordance with further embodiments, each pretension flange 23 may include a plate element 230, a flange 231 and an elastic member 232. The plate element 230 is affixable to either of the top or bottom side of the TT strap 20 at the outboard end 213. The flange 231 is abuttable with the distal end of the corresponding hub arm part 415. The elastic member 232 serves to elastically couple the flange 231 with the plate element 230.

Figure 8:
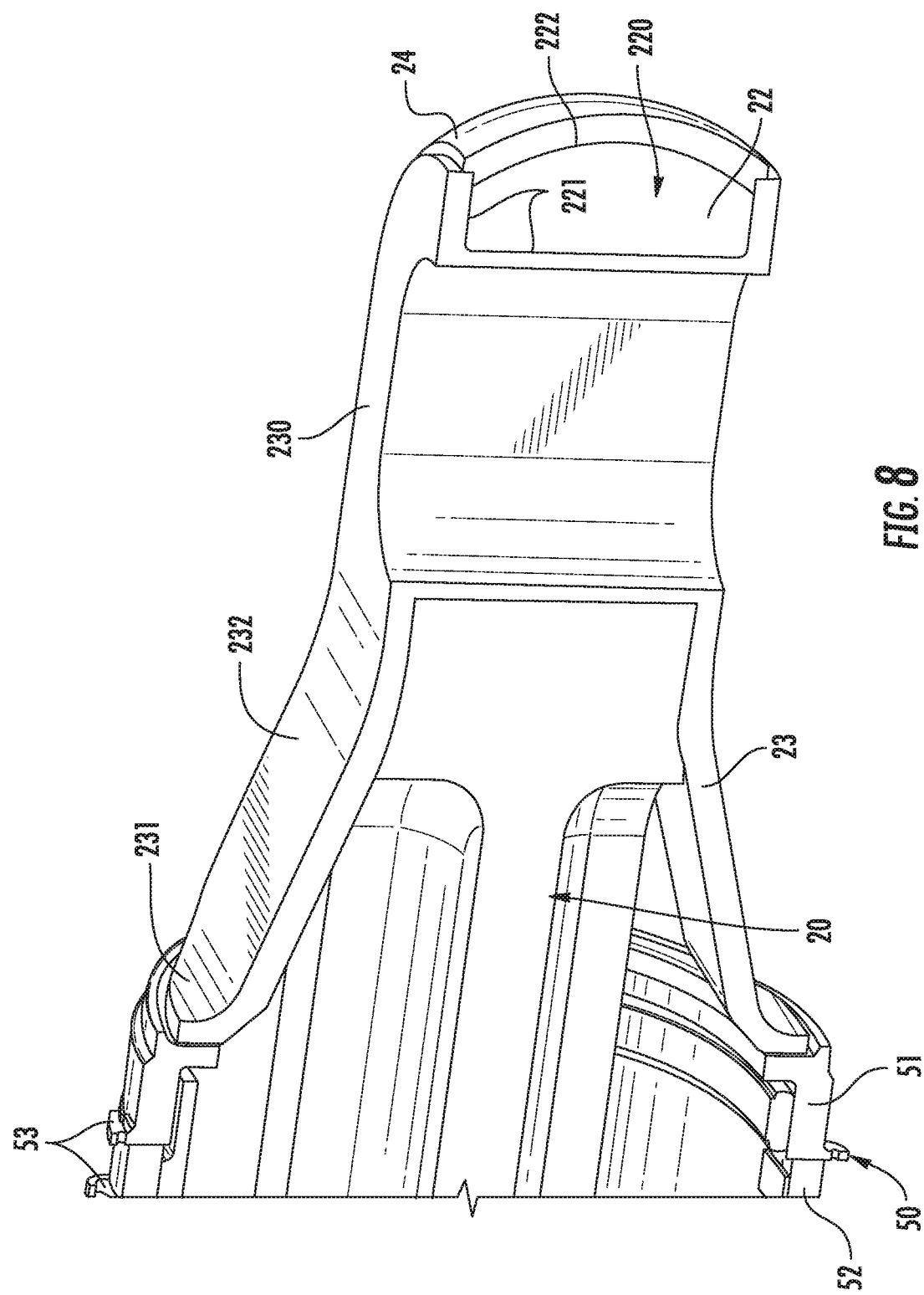
FIG. 8 is a cutaway side view illustration an operation of pretension flanges of a tension torsion strap in accordance with embodiments.

The application of pretension to the pretension flanges 23 may be achieved as described below with additional reference to FIG. 8. As shown in FIG. 8, the distal ends of the hub arm parts 415 may include pretension assemblies 50. The assemblies 50 include a retainer 51 and a jam nut 52. The jam nut 52 is rotatably disposed on the hub arm part 415 to assume first, non-tightening positions and second, tightening positions. At the first, non-tightening position, each jam nut 52 is disposed at an inboard position along the hub arm part 415 and the retainer 51 does not exert any pretension force onto the pretension flanges 23. Conversely, at the second, tightening position, each jam nut 52 is disposed at an outboard position along the hub arm part 415. In this case, the jam nut 52 abuts with the retainer 51 and urges the retainer 51 towards the pretension flange 23. This urging can have a magnitude sufficient to maintain the TT strap 20 in tension even if the corresponding blade 40 is at a top position of the propulsor 4 and the weight of the blade 40 is bearing down on the TT strap 20.

Thus, a method of applying pretension to the TT straps 20 is provided. The method includes disposing the hub casing 413 as noted above, manipulating the pretension assemblies 50 to assume the first, non-tightening positions inboard on the hub arm parts 415 and anti-rotationally connecting the TT straps 20 to the central hub 41 and the blades 40 to the TT straps 20. The method then includes re-manipulating the pretension assemblies 50 to assume the second, tightening outboard positions on the hub arm parts 415 and against the pretension flanges 23. Finally, the method may include securing the pretension assemblies 50 in the second, tightening positions by safety cabling via the lug nuts 53 (see FIG. 6).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. By way of example, aspects of the invention can be used in other contexts, such as propellers used in fixed wing aircraft or blades for wind turbines, or in other non-aircraft contexts where a tension torsion strap is used and needs to be in consistent minimum tension. Accordingly, the invention is not to be seen as limited by the foregoing description, but is only limited by the scope of the appended claims.

What is claimed is:

1. A tension torsion strap by which a blade is connectable with a hub of a propulsor, the tension torsion strap comprising:
    an elongate body formed to define attachment features at opposite ends thereof, the attachment features being connectable to the blade at one of the opposite ends and to the hub at the other of the opposite ends;
    fibrous materials extending along the elongate body and around the attachment features; and
    pretension flanges elastically interposable between the hub and the elongate body, the pretension flanges being affixable to one of the opposite ends of the elongate body such that a distal end of the pretension flanges is abuttable with the hub, wherein the pretension flanges are operable to maintain pretension in the fibrous materials above a predefined pretension level when the attachment features are connected to the blade and the hub.

2. The tension torsion strap according to claim 1, wherein the elongate body comprises an I-beam.

3. The tension torsion strap according to claim 1, wherein the elongate body comprises a strap casing to encompass the fibrous materials.

4. The tension torsion strap according to claim 3, wherein the strap casing comprises urethane.

5. The tension torsion strap according to claim 1, wherein the attachment features comprise racetrack-shaped spools.

6. The tension torsion strap according to claim 1, wherein the fibrous materials have a spherical cross-sectional shape at each of the opposite ends.

7. The tension torsion strap according to claim 1, wherein the pretension flanges each comprise:
    a plate element affixable to one of the opposite ends of the elongate body;
    a flange abuttable with the hub; and
    an elastic member by which the flange is coupled with the plate element.

8. The tension torsion strap according to claim 1, wherein the predefined pretension level is a percentage of an expected centrifugal force load.

9. A propulsor, comprising:
    a hub including first and second plates respectively formed to define attachment through-holes at blade locations;
    a hub casing including an interior part surrounding the hub and hub arm parts extending outwardly from the interior part at the blade locations; and
    tension torsion straps in accordance with claim 1, the tension torsion straps being extendable through the hub arm parts to connect blades with the hub at the blade locations.

10. The propulsor according to claim 9, further comprises oblong fasteners which are extendable through the attachment through-holes and the attachment features.

11. The propulsor according to claim 9, further comprising pretension assemblies respectively disposed at each of the hub arm parts.

12. The propulsor according to claim 11, wherein the pretension flanges are elastically interposable between a corresponding one of the pretension assemblies and the elongate body and are configured to maintain pretension in the fibrous materials of a percentage of an expected centrifugal force load.

13. A method of applying pretension to a tension torsion strap by which a blade is connectable with a hub of a propulsor, the hub comprising a hub casing including an interior part and hub arm parts such that the interior part surrounds the hub and the hub arm parts extend outwardly from the interior part, the method comprising:

arranging pretension assemblies in a first, non-tightening position on the hub arm parts;

connecting tension torsion straps to the hub and blades; and adjusting the pretension assemblies to assume a second, tightening position on the hub arm parts and against pretension flanges of the tension torsion straps, wherein in the second, tightening position a jam nut of the pretension assemblies is arranged in contact with a retainer of the pretension assemblies.

14. The method according to claim 13, further comprising securing the pretension assemblies in the second, tightening position.

\* \* \* \* \*